United States Patent Office.

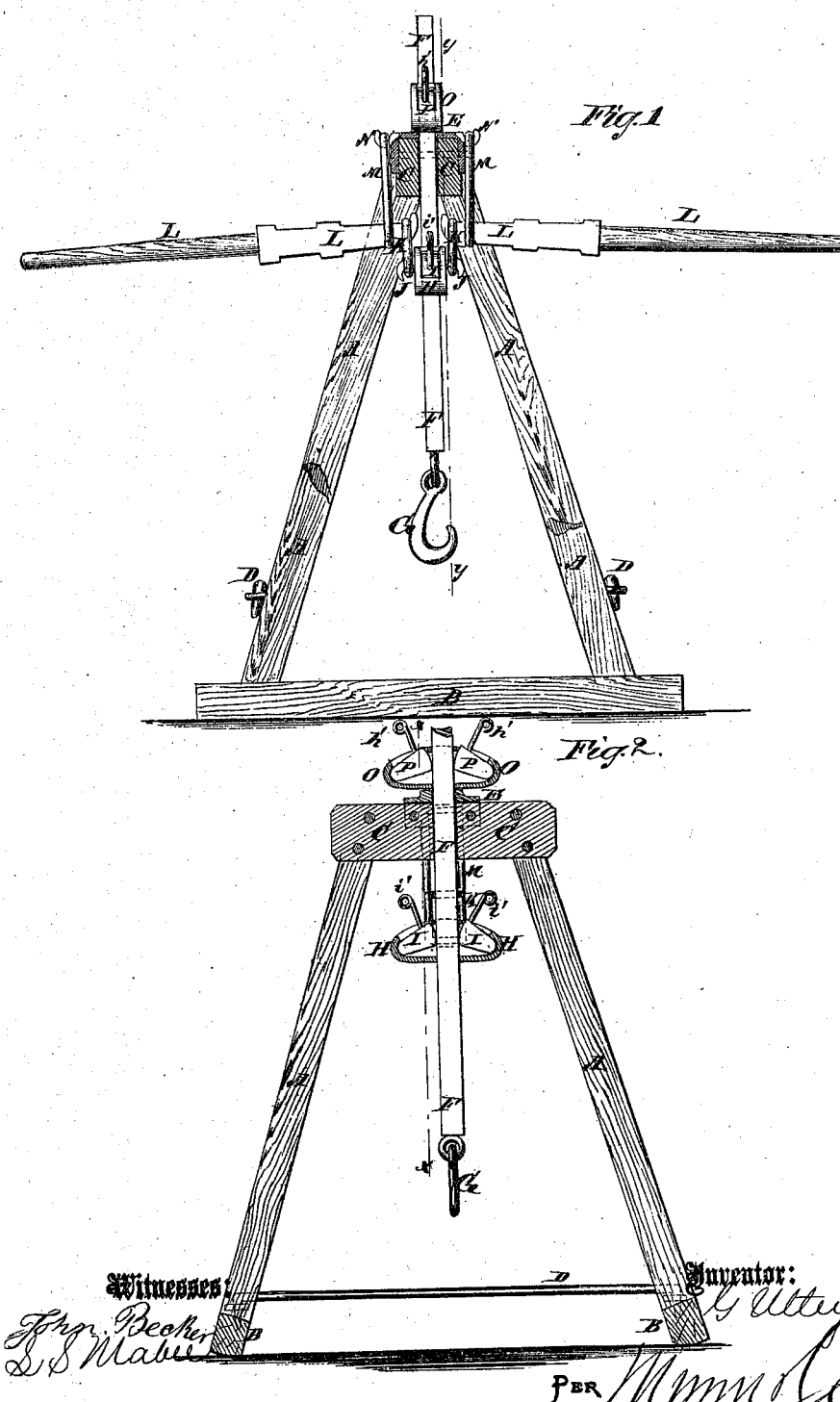

GREY UTLEY, OF CHARLOTTE, NORTH CAROLINA, ASSIGNOR TO HIMSELF AND GLENN & WRIGHT, OF ATLANTA, GEORGIA.

Letters Patent No. 106,238, dated August 9, 1870.

IMPROVEMENT IN STUMP-PULLER.

The Schedule referred to in these Letters Patent and making part of the same.

To all whom it may concern:

Be it known that I, GREY UTLEY, of Charlotte, in the county of Mecklenburg and State of North Carolina, have invented a new and useful Improvement in Stump-Puller; and I do hereby declare that the following is a full, clear, and exact description thereof, which will enable others skilled in the art to make and use the same, reference being had to the accompanying drawing forming part of this specification, in which—

Figure 1 is an end view of my improved stump-puller, partly in section, through the line $x\ x$, fig. 2.

Figure 2 is a vertical section of the same, taken through the line $y\ y$, fig. 1.

Similar letters of reference indicate corresponding parts.

My invention has for its object to furnish an improved stump-puller, which shall be simple in construction, effective in operation, and easily and conveniently operated; and It consists in the construction and combination of the various parts of the machine, as hereinafter more fully described.

A are the uprights of the machine, the lower ends of which are securely framed into the sills B, and the upper ends of which are securely bolted to the beam C.

The frame-work A B C must be made strong to enable it to withstand the strain upon it.

The lower parts of the side uprights A are connected, and kept from being spread apart by the downward pressure upon the frame-work, by the rods D, which have hooks formed upon each end, which hook into eye-bolts or staples attached to the said uprights, so that the said rods may be conveniently detached, for convenience in placing the machine over stumps, and other things to be raised.

To the middle part of the beam C is attached a plate, E, the side parts of which overlap the sides of the said beam C, and through the center of which, and through the center of the said beam C, is formed a square hole, through which passes the square bar F. To an eye formed in the lower end of the bar F is attached a hook, G, as shown in figs. 1 and 2.

H is a block, through a square hole in the center of which passes the bar F, and in recesses in the ends of which are placed the dogs I, the inner ends of which rest against the opposite sides of the bar F, so that the block H, when raised, will carry the said bar F with it. The dogs I are provided with handles $i'$, for convenience in inserting and removing them when required.

Upon both sides of the block H are attached hooks or catches J, upon which are hooked the lower ends of the links K, the upper ends of which are placed upon the ends of the levers L.

M are links, through which the levers L pass, and the lower ends of which rest in notches in the lower sides of said levers near their ends. The upper ends of the links M are hooked upon hooks or catches, N, formed upon the opposite sides of the flanged plate E.

O is a block, with a hole through its center, through which the bar F passes, and which is provided with dogs P $p'$, in the same manner as the block H. The block O is made without side hooks or catches, and rests upon the upper side of the flanged plate E.

In using the machine, it is placed over the stump to be pulled, or any other object to be raised, and the bar F is made fast to said object by means of the hook G. The levers L and links M K are then arranged, as shown in fig. 1. Then, by operating the levers L, as the outer ends of the said levers are moved downward, the block H is raised, carrying with it the bar F, and whatever may be attached to said bar. As the outer ends of the levers L are raised the block O clamps the bar F, and holds it from being drawn back by the weight attached to the said bar, and the block H I, by its own weight, drops down to give the levers a new purchase.

Having thus described my invention,

I claim as new and desire to secure by Letters Patent—

An improved stump-puller, formed by the combination of the uprights A, sills B, detachable brace-rods D, beam C, flanged plate E, having hooks or catches N formed upon its opposite sides, links M, levers L, links K, blocks H, with its dogs I $i'$, and hooks J, bar F, hook G, and block O, with its dogs P $p'$, with each other, substantially as herein shown and described, and for the purposes set forth.

GREY UTLEY.

Witnesses:
HIRAM F. HILL,
E. W. LONG.